(12) United States Patent
Zansky et al.

(10) Patent No.: US 7,802,121 B1
(45) Date of Patent: Sep. 21, 2010

(54) AUXILIARY POWER SYSTEM

(75) Inventors: Zoltan Zansky, San Carlos, CA (US); Bill Jacobsen, Sunnyvale, CA (US)

(73) Assignee: Network Appliance, Inc., Sunnyvale, CA (US)

(*) Notice: Subject to any disclaimer, the term of this patent is extended or adjusted under 35 U.S.C. 154(b) by 445 days.

(21) Appl. No.: 11/390,355

(22) Filed: Mar. 27, 2006

(51) Int. Cl.
*G06F 1/26* (2006.01)

(52) U.S. Cl. .......................... 713/340; 307/64; 307/66; 320/166; 320/167

(58) Field of Classification Search .................... 307/64, 307/66; 713/340; 320/166, 167
See application file for complete search history.

(56) References Cited

U.S. PATENT DOCUMENTS

| | | | |
|---|---|---|---|
| 6,753,622 B2* | 6/2004 | Oughton, Jr. .................. | 307/64 |
| 7,049,711 B2* | 5/2006 | Kanouda et al. ............... | 307/66 |
| 7,245,469 B2* | 7/2007 | Nemoto et al. ................. | 361/65 |
| 2004/0010725 A1* | 1/2004 | Chan ........................... | 713/300 |
| 2007/0139018 A1* | 6/2007 | Mentelos ..................... | 320/166 |

* cited by examiner

*Primary Examiner*—Albert Wang
(74) *Attorney, Agent, or Firm*—Suiter Swantz pc llo

(57) ABSTRACT

The present invention is a method and system for providing auxiliary power during a power interruption. An auxiliary power system of the present invention may be added to a power supply to provide auxiliary power during a power dip or power interruption to the power supply. The auxiliary power system may include a power storage device and a power storage charger which is powered by the power supply when power is supplied to the power supply. The power storage charger may charge the power storage device. The auxiliary power system may include a boost converter to provide a constant output voltage during a power interruption. A boost converter may also increase the output voltage supplied by the power storage device suitable for a load receiving power from the power supply.

8 Claims, 4 Drawing Sheets

AUXILIARY POWER SYSTEM

FIELD OF THE INVENTION

The present invention generally relates to the field of power supplies, and more particularly to a method and system for providing auxiliary power during a power interruption.

BACKGROUND OF THE INVENTION

Many individuals and businesses rely upon an electrical energy supply to power necessary electrical equipment. For example, a financial institution may require an electrical energy supply to power computer systems and server systems which handle financial transactions. If a power interruption should occur, financial transactions may not be completed, may not be recordable and may not be accessible. When financial transactions are not completed, lost revenue and increased maintenance costs may be attributed to the financial institution.

Typically, electrical equipment may include a power supply coupled to an alternating current (AC) power source. A conventional approach to prevent a power interruption is to provide supplemental power to electrical equipment during a power interruption by an uninterruptible power supply (UPS) added to the power supply of the electrical equipment. UPS equipment may provide a continuous load of AC power to electrical equipment during the instance of an interruption or power drop of the AC power source.

There are significant drawbacks associated with utilizing UPS equipment to provide supplemental power during a power interruption. The addition of UPS equipment, which may include a battery, battery charger and inverter, may significantly increase the cost to produce the electrical equipment. Additionally, in order to supply a typical AC power supply of 120 Volts at 60 Hertz, a battery of the UPS equipment may be at least 12 volts in typical applications. Batteries of at least 12 volts tend to be large and heavy. As a result, addition of UPS equipment increases the form factor and weight of electrical equipment. Consequently, a method and system of providing auxiliary power during a power interruption is necessary.

SUMMARY OF THE INVENTION

Accordingly, the present invention is directed to a method and system for providing auxiliary power during a power interruption. In an embodiment of the invention, an auxiliary power system of the present invention may be added to a power supply to provide auxiliary power for a load during a power dip or power interruption to the power supply. The auxiliary power system may include a power storage device and a power storage charger which is powered by the power supply when power is supplied to the power supply. The power storage charger may charge the power storage device. The auxiliary power system may also include a boost converter to increase the output voltage supplied by the power storage device suitable for a load receiving power from the power supply. The boost converter may also ensure a constant output voltage is provided to the load during a power interruption.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally to FIGS. 1-4, exemplary embodiments of a method and system for providing auxiliary power are shown. The auxiliary power system of the present invention may be incorporated with conventional power supplies to provide auxiliary power to a load during a power interruption. It is contemplated that a power interruption may include any occurrence whereby a desired output power is not provided to the load. A power interruption may include a dip in the power supplied to the power supply, a failure to provide any power to the power supply, or an operational failure of the power supply itself. Depending upon the components and power ranges employed, it is contemplated that the auxiliary power system may supply power for a multitude of lengths of power interruptions. It is contemplated that auxiliary power system may provide power for short term power interruptions, such as power interruptions of less than three (3) seconds which per international statistical data would cover most short term power interruptions. The auxiliary power system may provide electrical power to a load at a reduced cost, weight and form factor compared to conventional uninterruptible power system (UPS) equipment and may be easily added to a power supply without affecting the operation of the power supply.

Figure 1:
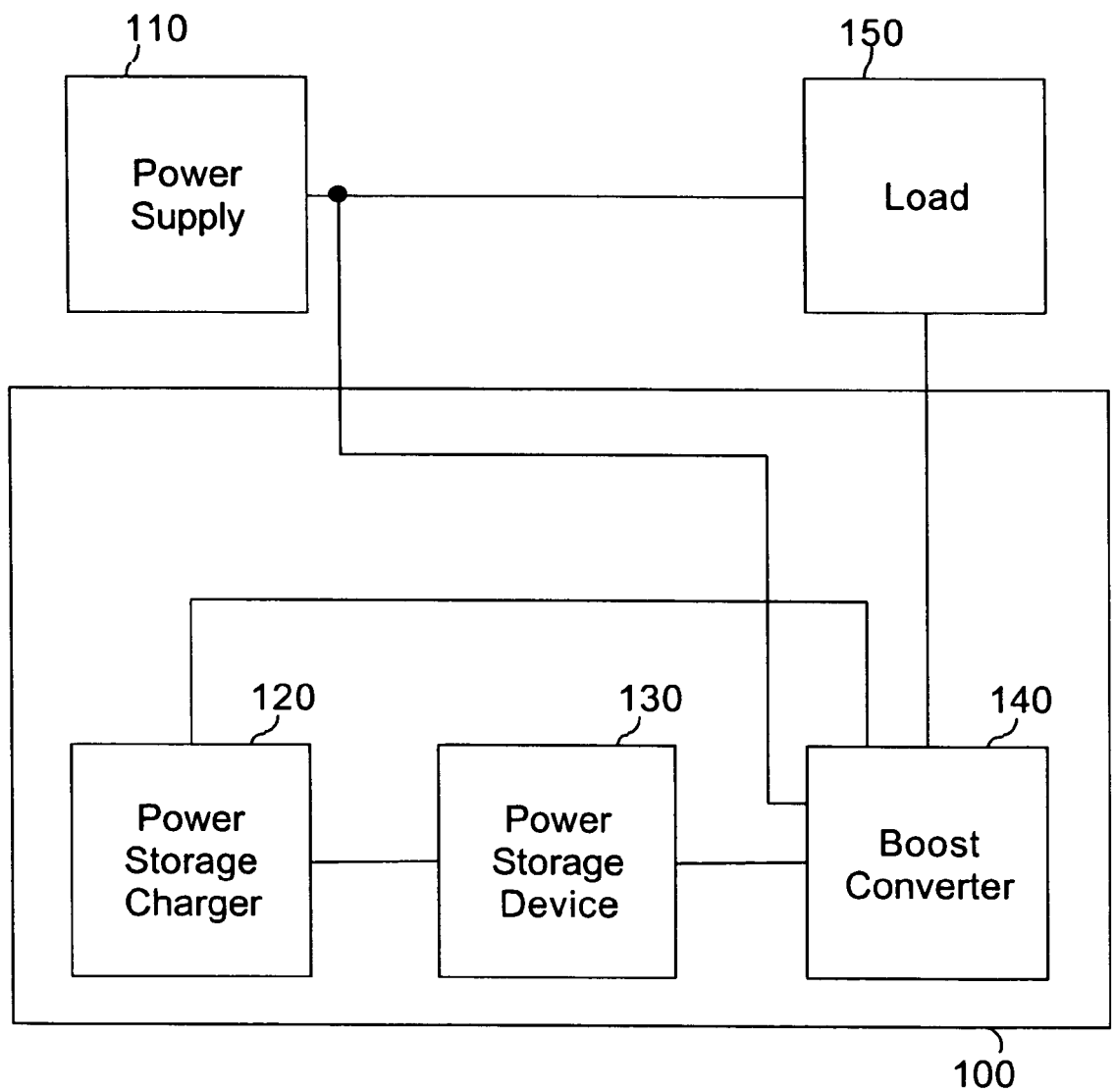
FIG. 1 depicts an auxiliary power system in accordance with an embodiment of the present invention.

Referring to FIG. 1, an auxiliary power system 100 in accordance with an embodiment of the present invention is shown. In an embodiment of the invention, auxiliary power system 100 may be incorporated with a power supply 110 to provide auxiliary power during a power interruption. In one embodiment of the invention, power supply 110 may receive an alternating current (AC) supply and convert the AC supply to a DC supply suitable for load 150. Power supply 110 may include a transformer, rectifier, filter and regulator to accept an AC input supply and provide a regulated DC output supply. However, it is contemplated that the auxiliary power system 100 may be operable with any type of power supply without departing from the scope and intent of the present invention.

Auxiliary power system 100 may include a power storage charger 120, a power storage device 130 and a boost converter 140. When the power supply 110 is receiving power from an AC source, power supply 110 may supply DC power to the power storage charger 120 to allow charging of the power storage device 130. It is contemplated that the output power of the power supply may be utilized to provide power to the power storage charger 120, which may be a battery charger, capacitance charger and the like. Power storage device 130 may be a rechargeable battery, capacitor and the like. If the output voltage is greater than the voltage necessary for the power storage charger 120, then the power storage charger 120 may include a buck converter comprising a transistor, diode and inductor to decrease the voltage supplied to the power storage charger 120.

If power supply 110 does not receive input power, then power storage device 130 may supply power to load 150. In an embodiment of the invention, a boost converter 140 may be coupled to the power storage device 130. Boost converter 140 may increase the input voltage provided by the power storage device to a higher voltage which may be supplied to the load 150. For example, boost converter 140 may receive a 3 volt input voltage and increase the input voltage to an output voltage of 5 volts suitable for load 150. Boost converter 140 may include a controller, such as a pulse width modulated controller, which may control the operation of the boost converter 140 to ensure a constant output supply is provided to load 150 during the entire period of the power interruption.

Figure 2:
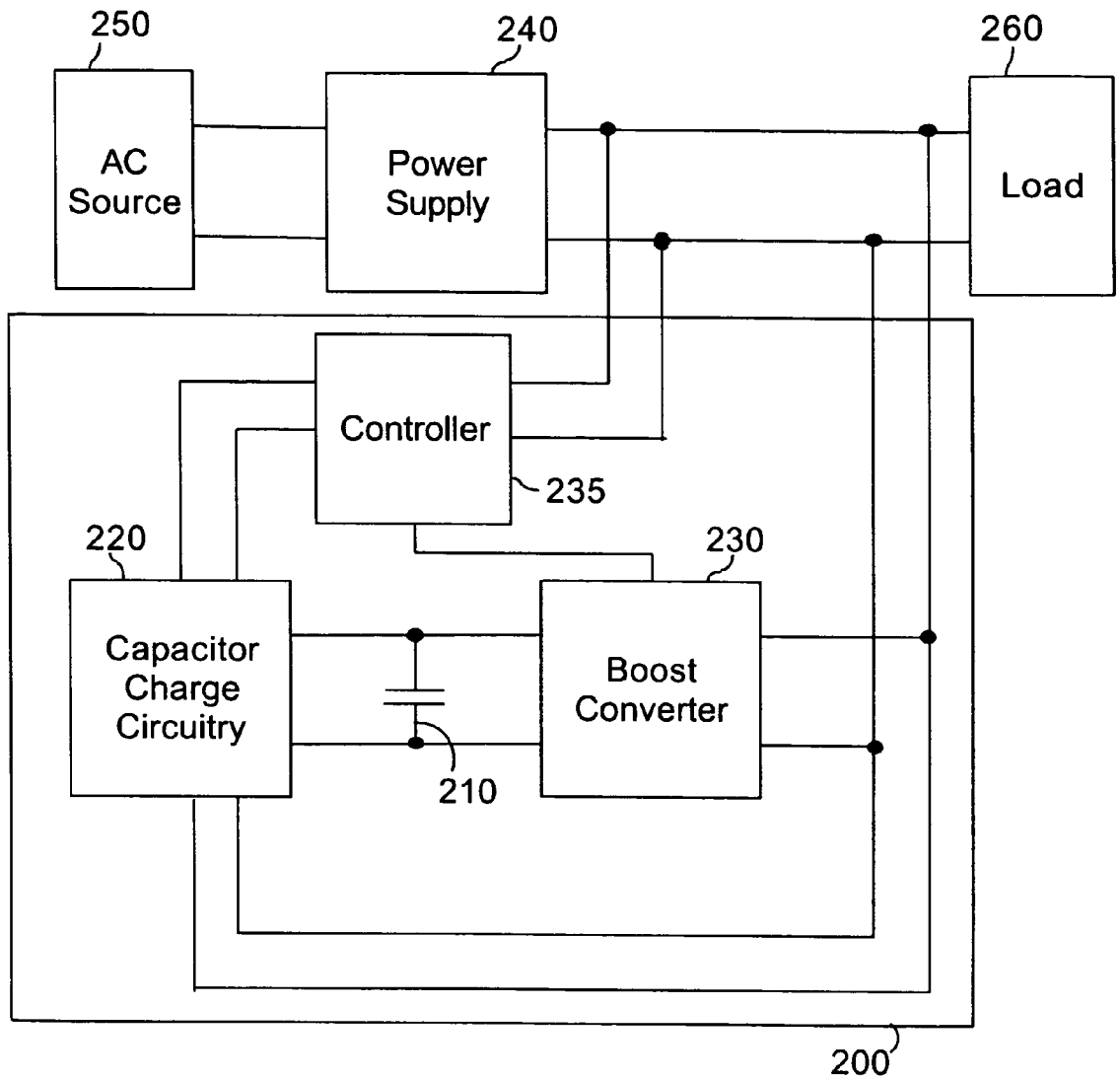
FIG. 2 depicts an auxiliary power system including a capacitor in accordance with an embodiment of the present invention.

Referring now to FIG. 2, an auxiliary power system 200 including a capacitor 210 in accordance with an embodiment of the present invention is shown. Auxiliary power system 200 may include a capacitor 210, a capacitor charger 220 and a boost converter 230. Power supply 240 may receive power from an AC source 250 and may convert the AC supply to a regulated DC supply suitable for load 260. AC source 250 may refer to an AC utility outlet that may substantially provide a 120-240 Volt, 50-60 Hertz power supply. If there is an interruption or dip in the power received by the power supply 240, a DC supply may be provided by capacitor 210 through the boost converter 230. Controller 235 may monitor the output voltage of the power supply and may control operation of the boost converter to maintain a constant output voltage while the voltage on capacitor 210 may be dropping as its power is transferred to the boost converter 230.

Figure 3:
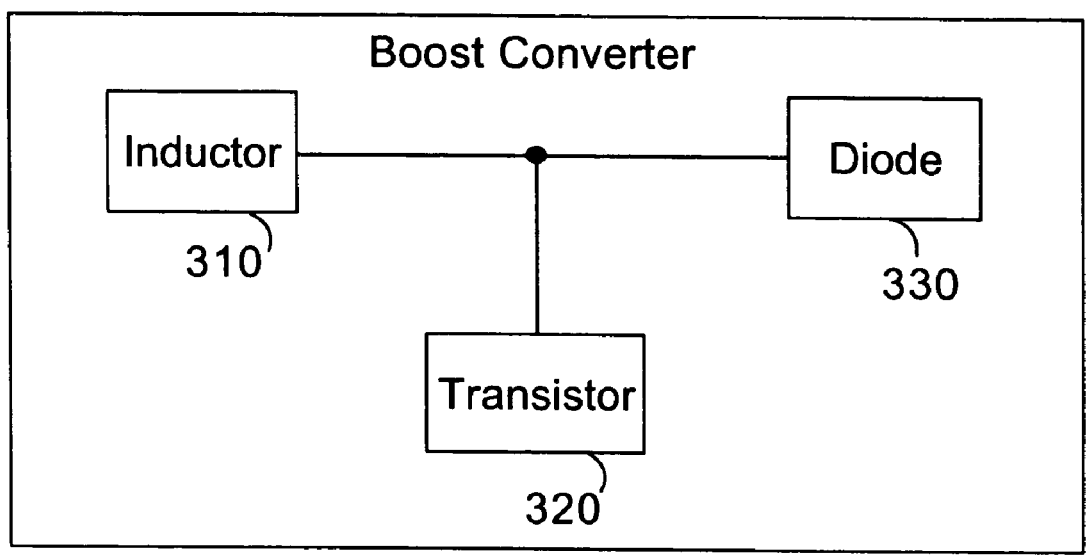
FIG. 3 depicts a boost converter in accordance with an embodiment of the present invention.

Referring to FIG. 3, an embodiment of a boost converter in accordance with the present invention is shown. Boost converter 230 may include an inductor 310, a transistor 320 and a diode 330. The output voltage of the boost converter may be dependent upon the inductance value of inductor 310. During a discharge phase, inductor current flows through diode 330 to charge the output and increase the output voltage to a higher voltage than the input voltage supplied by capacitor 210. The higher voltage may be held constant through a feedback loop of the boost converter to hold a desired output voltage suitable for load 260. Transistor 320 may be a field effect transistor, bipolar junction transistor and the like and may operate as a switch within the boost converter 230 to facilitate operation of the boost converter.

Capacitor charger 220 may be coupled to the controller 235 whereby the power supply 240 may supply power to the capacitor charger 220 when the power supply is operational and is receiving input power from the AC source 250. Capacitor charger 220 may include a voltage provided by the power supply coupled with a series resistor. The voltage provided by the power supply coupled with the series resistor may be further coupled to capacitor 210 in series. The value of the resistor may be adjusted to provide a desired rate of charging, typically described as time constant RC.

Auxiliary power system 200 may include controller 235 which monitors the output voltage supplied by the power supply 240. When a power disruption occurs, controller 235 may detect the power interruption. During a power interruption, controller 235 may initiate operation of the boost converter 230 and capacitor 210 may discharge its energy through boost converter 230 whereby a constant output voltage may be provided to load 260. A diode on the output of the power supply prevents reverse current flow and allows the transfer of energy from the boost converter to the load. The output power supply provided by the auxiliary power system 200 may be similar as provided by the power supply 240 when the power supply is receiving power from the AC power source 250. In one embodiment of the invention, controller 235 may be a pulse width modulated controller. Controller 235 may include a comparator which compares an output voltage of the power supply with a reference voltage to detect a power dip or power interruption. If the output voltage of the power supply is less than a reference voltage, then a power interruption may be detected by controller 235. Further, controller 235 may control the duty cycle of the boost converter to provide a desired constant output power for load 260.

In an exemplary embodiment of the present invention, power supply 240 may provide a 144 watt power supply to load 260. Capacitor 210 may be greater than 1 Farad. For example, capacitor 210 may be a 120 Farad capacitor that may be charged to 3 volts and may be discharged to 1 volt. During a power interruption or failure of power supply 240, capacitor 210 may provide input voltage to boost converter 230 which may output an initial voltage of 12 volts and supply a current of 12 amperes creating 144 watts of power to load 260, similar to the output power of the power supply 240. As the capacitor 210 is discharged to one volt, the output power supplied to the load may remain constant for a period of time as the discharge current from the super capacitor may increase from approximately 50 amperes to 100 amperes. In such an implementation, auxiliary power system 200 may provide auxiliary power for at least three seconds. This is advantageous as a large majority of power dips may only last less than 3 seconds. While auxiliary power system 200 may provide auxiliary power for at least three seconds, it is contemplated that a larger time period of auxiliary power may be provided by the auxiliary power system 200 of the present invention by employing a larger capacitance for capacitor 210 and the like.

In such an implementation where capacitor 210 may be charged to three volts, capacitor charge circuitry 220 may include a buck converter which converts the output of the power supply of 12 volts to 3 volts suitable for charging capacitor 210. A buck converter may include a transistor, such as a field effect transistor, a diode, an inductor and a control circuit to assure a constant charge current to the capacitor 210 and to cut off the charge when capacitor 210 reaches the maximum specified voltage, such as 3 volts. It is further contemplated that capacitor 210 may supply a higher initial voltage, such as 12 volts, by stacking a plurality of capacitors 210.

Capacitor 210 may refer to a supercapacitor or ultracapacitor. A supercapacitor may be an electrochemical capacitor with a large amount of storage capacity relative to its size and unavailable with conventional capacitors that may provide high rates of charge and discharge and may be accompanied with minimal degradation over many cycles in comparison to rechargeable batteries that tend to lose storage capability after many cycles. A supercapacitor may employ electrodes and electrolyte rather than conductive foils and dry separators employed in conventional capacitors. Electrode materials utilized by supercapacitors may include high surface area activated carbons, metal oxide and conducting polymers. In an embodiment of the invention, auxiliary power system may be fully re-charged in a short time period. This is highly advantageous as the auxiliary power system may be capable of providing auxiliary power during a series of short interruptions because the capacitor 210 may be quickly re-charged during periods of full power received by the power supply 240.

It is contemplated that any type of power storage device may be employed by those with ordinary skill in the art in conjunction with the auxiliary power system of the present invention without departing from the scope and intent of the present invention. It is further contemplated that the auxiliary power system may be employed in combination with UPS equipment to provide an additional source of auxiliary power without departing from the scope and intent of the present invention.

Figure 4:
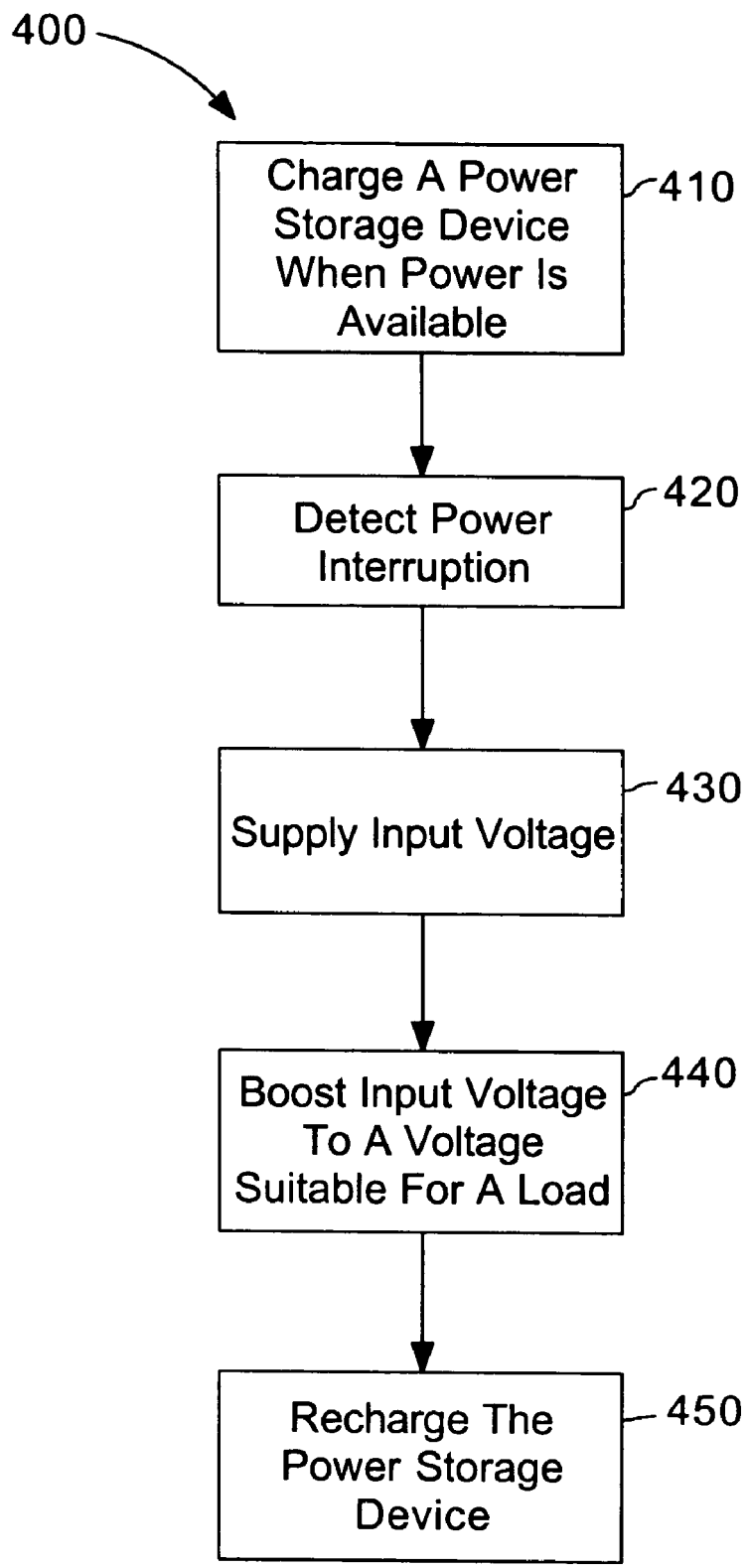
FIG. 4 depicts a process for providing auxiliary power during a power failure in accordance with an embodiment of the present invention.

Referring to FIG. 4, a process 400 for providing auxiliary power during a power failure in accordance with an embodiment of the present invention is shown. Process 400 may be performed by the auxiliary power system 100, 200 of FIGS. 1-2 in order to provide auxiliary power during a power outage event or failure of a power supply. Process 400 may begin by receiving input power. Power may be received from the power supply by a power storage charger to allow charging of the power storage device 410. In an embodiment of the invention, power storage device may be a capacitor. Upon detecting a power interruption 420, power storage device supplies an initial voltage 430. It is contemplated that a power interruption may be detected my comparing an output voltage of a power supply with a reference voltage. If the output voltage is less than a reference voltage, a power interruption may be occurring. Supplying an initial voltage may be implemented by discharging a capacitor. The input voltage may be boosted 440 to provide a desired output power for a load. It is contemplated that boosting of the input voltage supplied by a power storage device may provide a constant output voltage. When power is received by a power supply, the power storage device may be recharged 450 whereby it is suitable to provide supplemental power during another power interruption.

It is contemplated that auxiliary power system 100, 200 may operate in conjunction with a power supply to provide a constant output voltage with minimal down-time. During typical operation, a power supply may provide a constant output voltage. During a power disruption, power supply may provide a reduced voltage than is required for a load. In such a case, auxiliary power system 100, 200 may provide a constant output voltage during the duration of the power interruption which may reduce the down-time associated with power failures.

It is further contemplated that auxiliary power system 100, 200 of FIGS. 1 and 2 respectively and process 400 for providing auxiliary power of FIG. 4 may be implemented with a storage system to enhance reliability and reduce down-time of the storage system. In an exemplary embodiment of the invention, a storage system may refer to a centralized repository for information with common data management an protection. An example of a storage system may refer to a storage solution employing a NetApp Data ONTAP® storage operating system manufactured by Network Appliance of Sunnyvale, Calif. It is contemplated that the storage solution may include a single device, such as a computing appliance. Alternatively, a storage system may comprise a plurality of devices which are operatively coupled to form storage area network (SAN), network-attached storage (NAS) and the like.

It is believed that the system and method and system of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A system for providing a constant output voltage; comprising:
    a power supply, said power supply receiving an alternating current (AC) input and providing a direct current (DC) output voltage to a load; and
    an auxiliary power system incorporated with the power supply, said auxiliary power system including:
    a controller coupled to said DC output voltage of said power supply, said controller monitoring an amount of DC output voltage supplied by the power supply;
    a capacitor charger coupled to said controller;
    a capacitor coupled to said capacitor charger; and
    a boost converter including an input coupled to said capacitor and an output coupled to said load, said boost converter further coupled to said controller, said controller including a comparator which compares said DC output voltage supplied by said power supply with a reference voltage, wherein said controller is configured to detect a power interruption when said DC output voltage is less than said reference voltage and said controller is configured to initiate operation of said boost converter whereby said capacitor discharges energy through said boost converter to said load to maintain a substantially constant DC voltage at said load.

2. The system as claimed in claim 1, wherein said capacitor charger receives said DC output voltage from said power supply when said power supply is receiving input power.

3. The system as claimed in claim 1, wherein said boost converter includes an inductor, a transistor and a diode.

4. The system as claimed in claim 1, wherein said controller is a pulse width modulated controller.

5. The system as claimed in claim 4, wherein said pulse width modulated controller controls a duty cycle of said boost converter to provide said substantially constant DC voltage to said load during a power interruption for a period of time greater than 3 seconds.

6. The system as claimed in claim 1, wherein said capacitor is greater than 1 Farad.

7. The system as claimed in claim 6, wherein said capacitor is capable of being charged to 3 volts and discharged to 1 volt.

8. The system as claimed in claim 1, wherein said boost converter is suitable for converting a 3 volt input supply from said capacitor to a 12 volt output supply for said load.

* * * * *